United States Patent
Suzuki et al.

(10) Patent No.: US 11,741,495 B2
(45) Date of Patent: Aug. 29, 2023

(54) DEVICE FOR MANAGING PROMOTION WORK FOR PRODUCT THAT MANUFACTURER DESIRES TO SELL, AND PROGRAM EXECUTED ON SAID DEVICE

(71) Applicant: Studist Corporation, Tokyo (JP)

(72) Inventors: Satoshi Suzuki, Tokyo (JP); Itsuki Sakitsu, Tokyo (JP)

(73) Assignee: Studist Corporation, Tokyo (JP)

( * ) Notice: Subject to any disclaimer, the term of this patent is extended or adjusted under 35 U.S.C. 154(b) by 0 days.

(21) Appl. No.: 17/623,494

(22) PCT Filed: Jul. 1, 2020

(86) PCT No.: PCT/JP2020/025865
§ 371 (c)(1),
(2) Date: Dec. 28, 2021

(87) PCT Pub. No.: WO2021/002397
PCT Pub. Date: Jan. 7, 2021

(65) Prior Publication Data
US 2022/0318843 A1   Oct. 6, 2022

(30) Foreign Application Priority Data
Jul. 2, 2019   (JP) .................. 2019-123829

(51) Int. Cl.
*G06Q 30/02*      (2023.01)
*G06Q 30/0242*    (2023.01)
*G06Q 30/0283*    (2023.01)

(52) U.S. Cl.
CPC ..... *G06Q 30/0242* (2013.01); *G06Q 30/0283* (2013.01)

(58) Field of Classification Search
None
See application file for complete search history.

(56) References Cited

U.S. PATENT DOCUMENTS

2002/0194081 A1* 12/2002 Perkowski ............. H04L 61/00
                                                          705/26.1
2010/0174671 A1*  7/2010 Brooks ................. G06Q 30/02
                                                           706/12
(Continued)

FOREIGN PATENT DOCUMENTS

JP          201691385 A         5/2016
JP          201810372 A         1/2018
(Continued)

OTHER PUBLICATIONS

First Office Action for corresponding Japanese Application No. 2019-123829 dated Sep. 20, 2019 and its English Machine Translation.

(Continued)

*Primary Examiner* — Vincent M Cao
(74) *Attorney, Agent, or Firm* — Renner, Otto, Boisselle & Sklar, LLP

(57) ABSTRACT

The device according to the present invention is configured to be able to communicate with a managing device managed by a retail company that sells a product, and the device comprises: delivery means for delivering an instruction that at least describes promotion work for promoting a sale of the product, to the managing device; reception means for receiving one or more evidences showing a result of the promotion work performed at the retail company according to the instruction, from the managing device; and calculation means for calculating a degree of achievement of the promotion work at the retail company based on the one or more evidences.

24 Claims, 7 Drawing Sheets

(56) References Cited

U.S. PATENT DOCUMENTS

2016/0155150 A1* 6/2016 Zhang ............... G06Q 30/0261
705/14.58
2019/0156261 A1 5/2019 Nishino et al.

FOREIGN PATENT DOCUMENTS

WO    WO-2013167956 A1 * 11/2013  ............. G06Q 30/02
WO    WO-2019046833 A1 *  3/2019  ......... G06Q 30/0206

OTHER PUBLICATIONS

Final Office Action for corresponding Japanese Application No. 2019-123829 dated Jan. 10, 2020 and its English Machine Translation.

Yuidea Inc., "What is sales promotion (promotion)? Its meaning, methods and examples, what is effective markeing?" [online], [retrieved on Jun. 12, 2019], Internet <URL: https://msl.yuidea.co.jp/knowledge/3184> and english Machine Translation.

International Search Report for related International Application No. PCT/JP2020/025865 dated Sep. 29, 2020 and its English Translation.

* cited by examiner

[Figure 1]
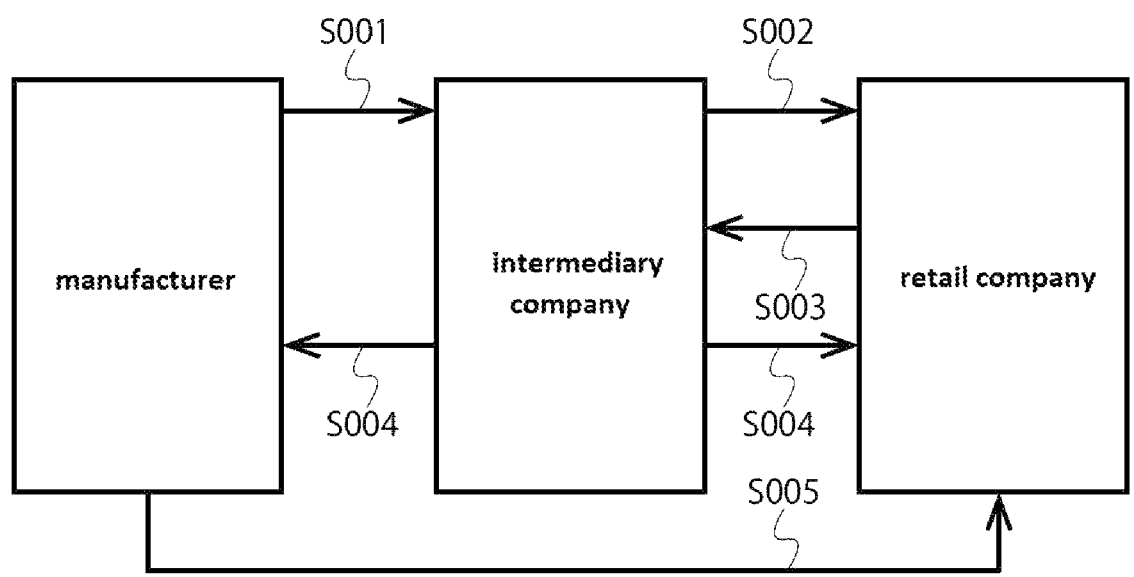

[Figure 2]
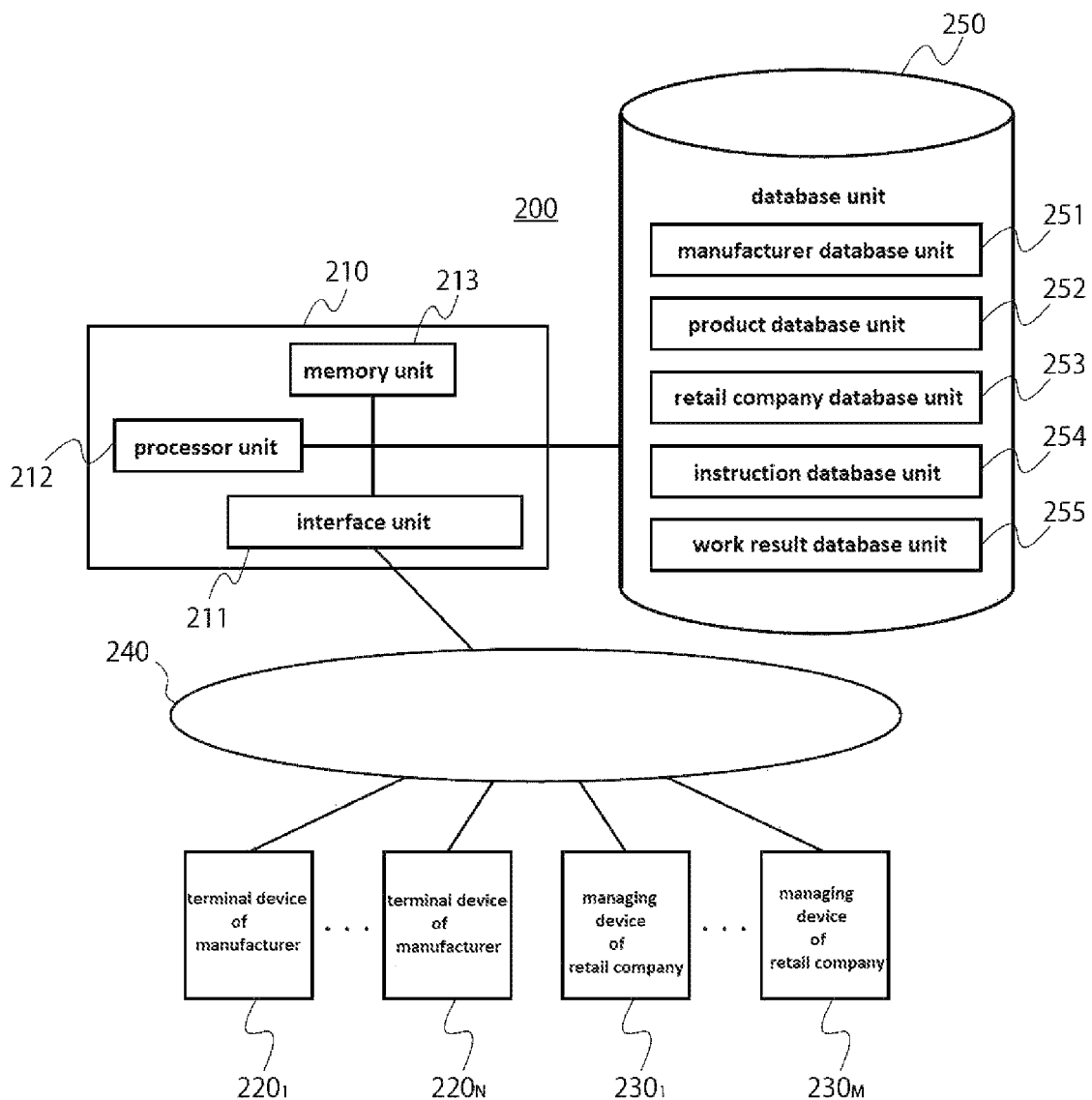

[Figure 3A]
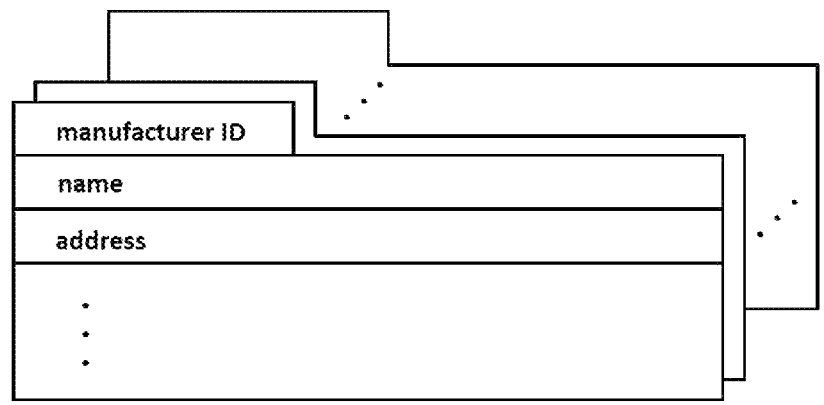
[Figure 3B]
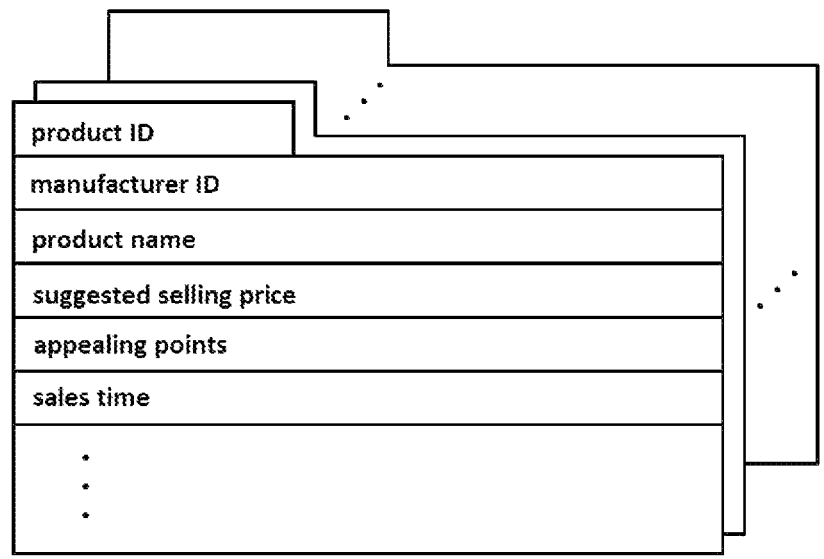

[Figure 3C]
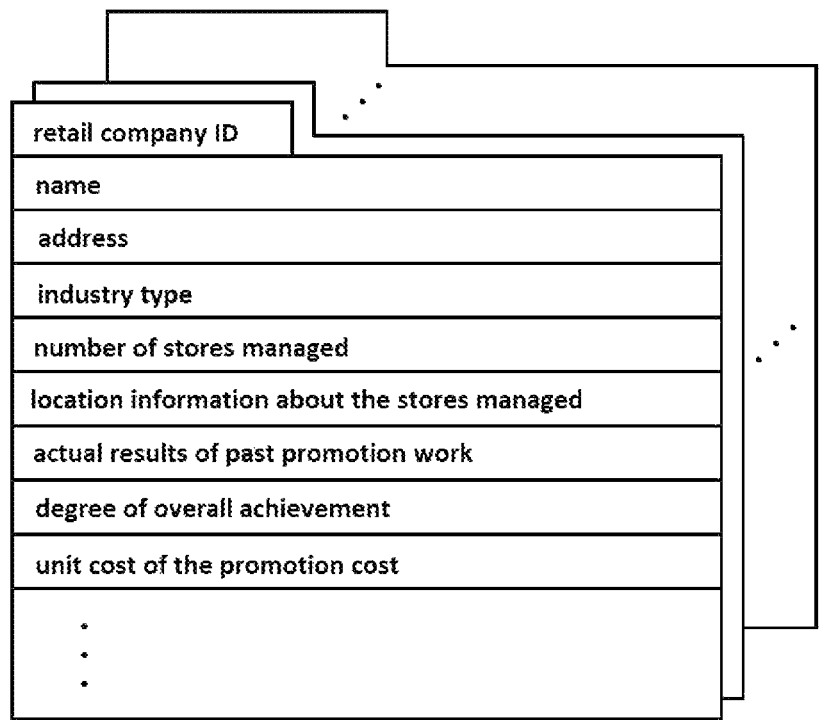
[Figure 3D]
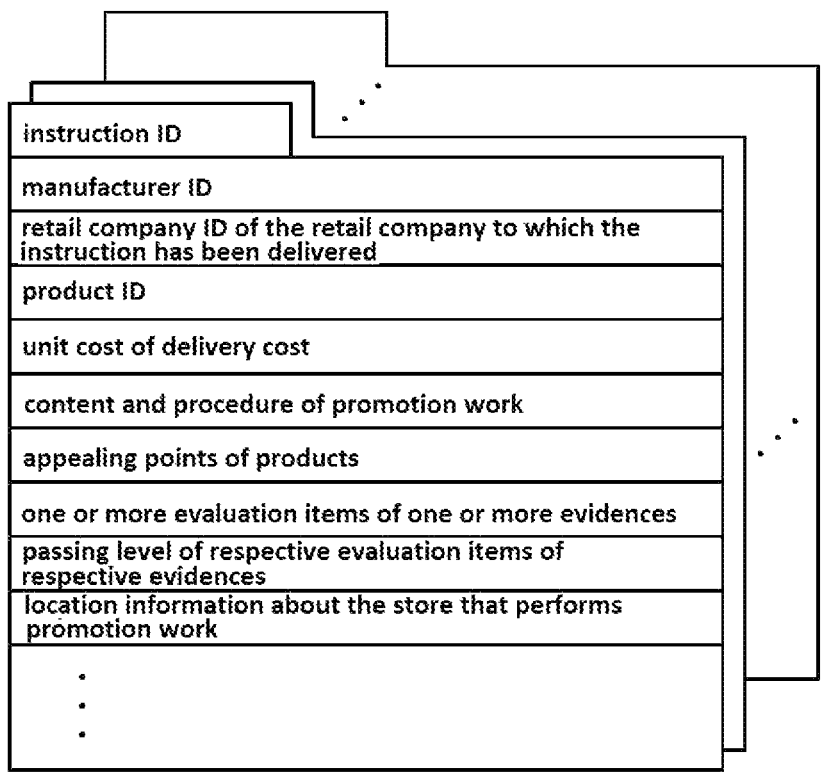

[Figure 3E]
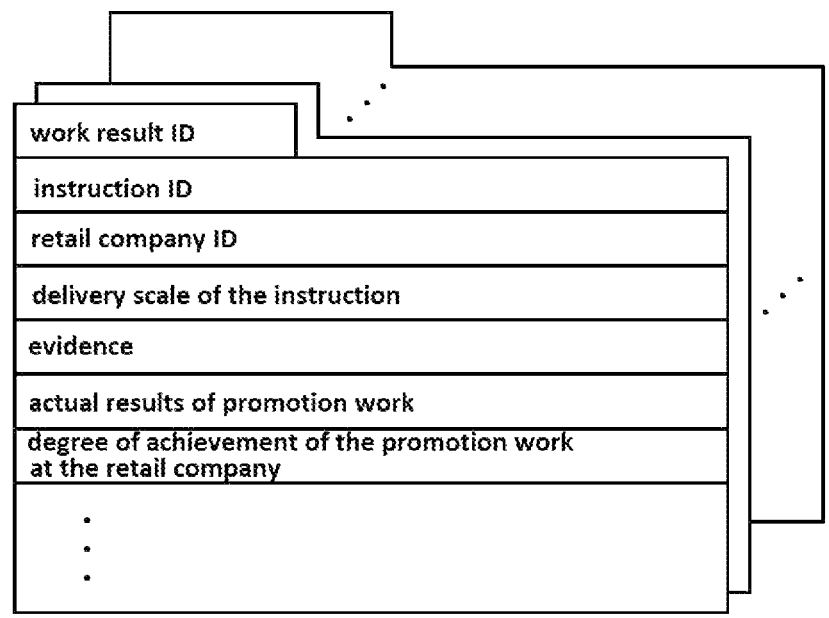

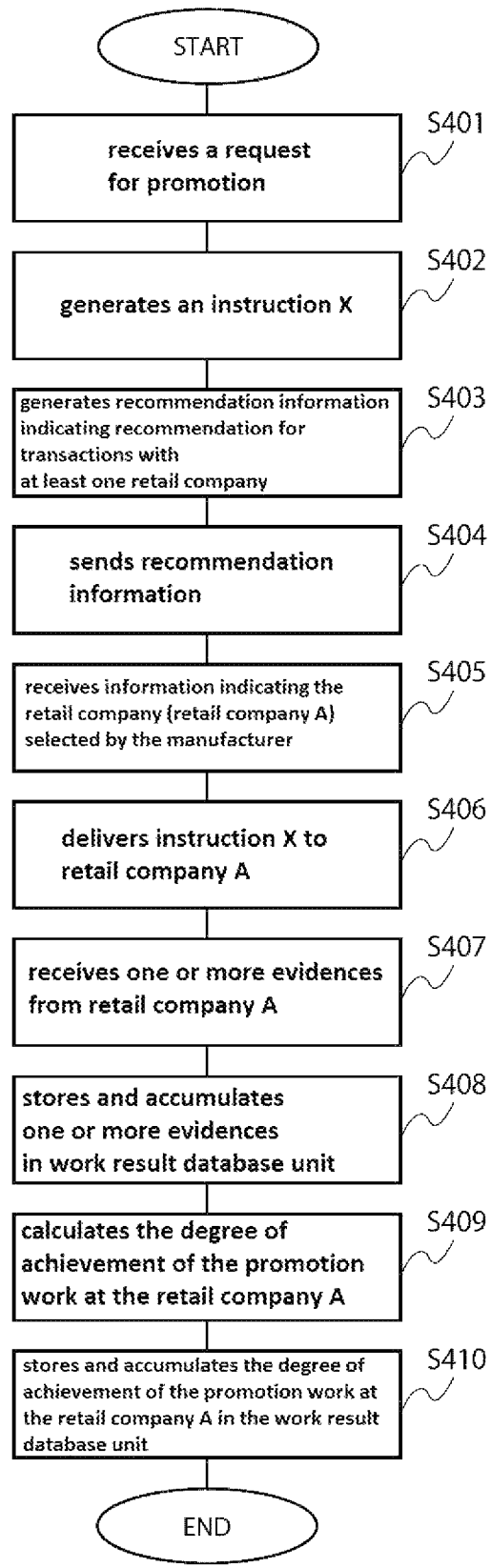
[Figure 4]

[Figure 5]
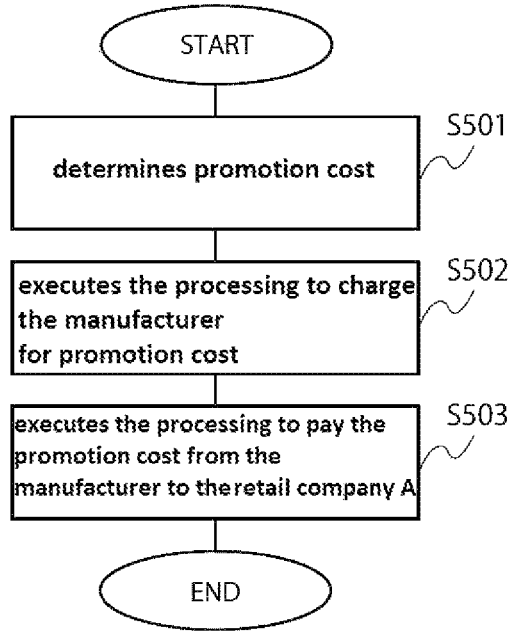
[Figure 6]
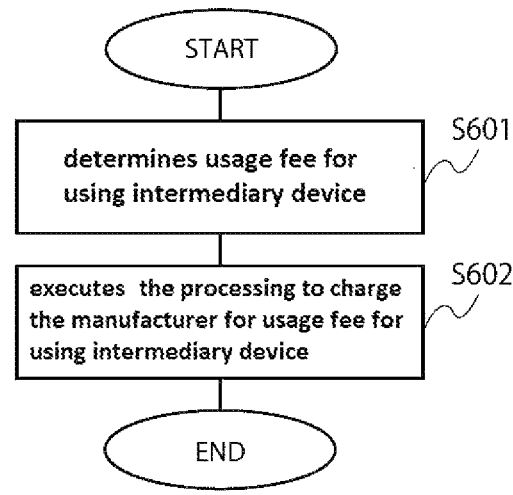

DEVICE FOR MANAGING PROMOTION WORK FOR PRODUCT THAT MANUFACTURER DESIRES TO SELL, AND PROGRAM EXECUTED ON SAID DEVICE

This application is a national phase of International Application No. PCT/JP2020/025865 filed 1 Jul. 2020, which claims priority to Japan Application No. 2019-123829 filed 2 Jul. 2019, the entireties of which are hereby incorporated by reference.

DESCRIPTION OF EMBODIMENTS

Technical Field

The present invention relates to a device for managing promotion work of products that a manufacturer wishes to sell, and a program executed on the device.

BACKGROUND ART

It has been conventionally known that manufacturers perform "promotion" activities for products the manufacturers wish to sell (especially new products) (see, for example, Non-Patent Document 1).

For example, for selling products that a manufacturer wishes to sell at stores of a retail company, traditionally, the manufacturer has prepaid the "promotion cost" for the products to the retail company, the sales educator of the retail company has gathered the sales staff of the stores of the retail company and held "product study sessions" in various places (where the usage fee of the meeting rooms for the study sessions, the lunch box fee, the business trip cost of the sales staff of the stores, etc., are paid from the promotion cost), and the sales staff participated in the "product study sessions" of the stores of the retail company have displayed products at the stores and explained the products to customers at the stores.

CITATION LIST

Non-Patent Documents

[Non-Patent Document 1] YUIDEA Inc., "What is sales promotion (promotion)? Its meaning, methods and examples, What is effective marketing?", [online], [retrieved on Jun. 12, 2019], Internet <URL: https://msl.y-uidea.co.jp/knowledge/3184>

SUMMARY OF INVENTION

Technical Problem

There has been a problem of not being able to know whether the promotion work as requested by the manufacturer is performed at the retail company (such as whether the products are displayed at the stores of the retail company as requested by the manufacturer, or whether the products are explained at the stores of the retail company as requested by the manufacturer) until the manufacturer itself or the investigation company commissioned by the manufacturer conducts a field survey of the promotion work performed at the retail company (for example, it is not known until the staff of the investigation company visits a store of the retail company and checks the display status etc. of the products at the store).

There must be a considerable time lag between the manufacturer requesting the retail company to perform the promotion work and the manufacturer grasping the actual results of the promotion work performed at the retail company. Thus, there have also been a problem of large time loss on the manufacturer end and a problem of enormous costs required for the manufacturer to grasp the actual results of the promotion work performed at the retail company.

An objective of the present invention is to provide: a device capable of aggregating and managing (such as aggregating and managing in real time) whether the promotion work as requested by the manufacturer is performed at the retail company (such as whether the products are displayed at the stores of the retail company as requested by the manufacturer, or whether the products are explained at the stores of the retail company as requested by the manufacturer), without the manufacturer itself, or an investigation company commissioned by the manufacturer, needing to conduct a field survey of the promotion work performed at the retail company (for example, without the staff of the investigation company needing to visit a store of the retail company and checking the display status etc. of the products at the store); and a program executed on the device.

Solution to Problem

In one aspect of the present invention, the device according to the present invention is a device for managing promotion work of a product that a manufacturer wishes to sell, the device configured to be able to communicate with a managing device managed by a retail company that sells the product, the device comprising: delivery means for delivering an instruction that at least describes promotion work for promoting a sale of the product, to the managing device; reception means for receiving one or more evidences showing a result of the promotion work performed at the retail company according to the instruction, from the managing device; and calculation means for calculating a degree of achievement of the promotion work at the retail company based on the one or more evidences.

According to one embodiment of the present invention, the reception means may receive the one or more evidences showing the result of the promotion work performed at one or more stores of the retail company according to the instruction; the degree of achievement of the promotion work at the retail company may include a storefront achievement ratio of the retail company; and the storefront achievement ratio of the retail company may be represented by $N_1/N_2$, where $N_1$ may be the number of stores in which the promotion work satisfying a passing level set by the manufacturer has been performed within a predetermined period among the number of one or more stores to which the instruction has been delivered, $N_2$ may be the number of the one or more stores to which the instruction has been delivered, and the passing level may be set in accordance with the instruction.

According to one embodiment of the present invention, the device may further comprise: means for determining a usage fee for using the device based on an actual result of past promotion work at the retail company; and means for executing processing to charge the manufacturer for the usage fee.

According to one embodiment of the present invention, the usage fee may include a delivery cost for delivering the instruction to the retail company, and the means for determining the usage fee may include: means for determining a rate for the delivery cost based on the actual result of the past promotion work at the retail company; and means for determining the delivery cost based on the rate.

According to one embodiment of the present invention, the device may further comprise: means for determining a usage fee for using the device based on the degree of achievement of the promotion work at the retail company, where retail companies to which the instruction has been delivered include the retail company; and means for executing processing to charge the manufacturer for the usage fee.

According to one embodiment of the present invention, the usage fee may include a delivery cost for delivering the instruction to the retail company, and the means for determining the usage fee may include: means for determining a rate for the delivery cost based on the degree of achievement of the promotion work at the retail company; and means for determining the delivery cost based on the rate.

According to one embodiment of the present invention, the device may further comprise: means for determining a promotion cost to be paid by the manufacturer to the retail company based on the degree of achievement of the promotion work at the retail company; and means for executing processing to collect the promotion cost from the manufacturer.

According to one embodiment of the present invention, the device may further comprise means for executing processing to pay at least part of the promotion cost from the manufacturer to the retail company.

According to one embodiment of the present invention, the device may be connected to a database unit, the database unit including stored thereon the degree of achievement of promotion work at each of a plurality of retail companies, and the retail company being one of the plurality of retail companies, and the device may further comprise; means for generating recommendation information indicating recommendation for a transaction with at least one retail company of the plurality of retail companies based on the degree of achievement of the promotion work at each of the plurality of retail companies; and means for notifying the manufacturer of the recommendation information.

According to one embodiment of the present invention, the device may be connected to a database unit, and the device may further comprise means for accumulating the degree of achievement of the promotion work at the retail company on the database unit immediately after the degree of achievement of the promotion work at the retail company is calculated.

According to one embodiment of the present invention, the device may be connected to a database unit, and the device may further comprise means for accumulating the one or more evidences on the database unit immediately after the one or more evidences is received.

According to one embodiment of the present invention, the database unit may be configured to be viewable by both the manufacturer and the retail company.

According to one embodiment of the present invention, each of the one or more evidences may include a reading completion percentage of the instruction and one or more images captured at the one or more stores, each of the one or more images including location information about where each of the one or more images is captured and time information about when each of the one or more images is captured, the device may further comprise analysis means for analyzing the one or more images, and the calculation means may calculate the degree of achievement of the promotion work at the retail company based on the reading completion percentage of the instruction, an analysis result of the one or more images, and the location information and the time information about the one or more images.

In one aspect of the present invention, the program according to the present invention is a program executed on a device for managing promotion work of a product that a manufacturer wishes to sell, the device configured to be able to communicate with a managing device managed by a retail company that sells the product, the device comprising a processor unit, where the program, when executed by the processor unit, causes the processor unit to execute at least: delivering an instruction that at least describes promotion work for promoting a sale of the product, to the managing device; receiving one or more evidences showing a result of the promotion work performed at the retail company according to the instruction, from the managing device; and calculating a degree of achievement of the promotion work at the retail company based on the one or more evidences.

Advantageous Effects of Invention

According to the present invention, the present invention allows providing of: a device capable of aggregating and managing (such as aggregating and managing in real time) whether the promotion work as requested by the manufacturer is performed at the retail company (such as whether the products are displayed at the stores of the retail company as requested by the manufacturer, or whether the products are explained at the stores of the retail company as requested by the manufacturer), without the manufacturer itself, or an investigation company commissioned by the manufacturer, needing to conduct a field survey of the promotion work performed at the retail company (for example, without the staff of the investigation company needing to visit a store of the retail company and checking the display status etc. of the products at the store); and a program executed on the device.

BRIEF DESCRIPTION OF DRAWINGS

FIG. 1 shows an example of a flow of a new business model for managing whether promotion work requested by a manufacturer is being performed at a retail company.

FIG. 2 shows an example of the configuration of a computer system 200 to achieve a new business model.

FIG. 3A shows an example of the structure of the information stored in the manufacturer database unit 251.

FIG. 3B shows an example of the structure of the information stored in the product database unit 252.

FIG. 3C shows an example of the structure of the information stored in the retail company database unit 253.

FIG. 3D shows an example of the structure of the information stored in the instruction database unit 254.

FIG. 3E shows an example of the structure of the information stored in the work result database unit 255.

FIG. 4 shows an example of the flow of the processing executed by the intermediary device 210.

FIG. 5 shows another example of the flow of the processing executed on the intermediary device 210.

FIG. 6 shows another example of the flow of the processing executed on the intermediary device 210.

DESCRIPTION OF EMBODIMENTS

The terms used herein will be defined as below.

As used herein, the "promotion cost" refers to the cost to promote the sale of a product. The product may be a commodity or may be a service.

As used herein, the "promotion work" refers to the work to promote the sale of a product.

As used herein, the "degree of achievement of promotion work at a retail company" refers to the degree to which the promotion work wished by the manufacturer is achieved at the retail company.

Hereinafter, embodiments of the present invention will be described with reference to the drawings.

1. New Business Model for Managing Whether the Promotion Work is Performed at the Retail Company as Requested by the Manufacturer FIG. 1 shows an example of a flow of a new business model for managing whether promotion work requested by a manufacturer is being performed at a retail company. Hereinafter, the steps of this flow will be described in detail.

Step S001: The manufacturer sends a request for promotion of a product that the manufacturer wishes to sell to an intermediate company. This request includes product information. This allows the manufacturer to designate the product to be promoted. In addition, this request may further include the name of the retail company that performs the promotion work, and the scale of the promotion work to be performed (e.g., the region for performing the promotion work, the duration for performing the promotion work, and the total number of retail companies that perform the promotion work). This allows the manufacturer to designate the retail company that sells the product targeted for the promotion, and the area and period for which the promotion is performed. Furthermore, this request may further include evaluation items for evidence (such as whether or not the angle at which an image is captured matches the designated angle, whether or not the designated product is shown, whether or not the designated number of the designated products are displayed, whether or not a designated point of purchase is placed). This allows the manufacturer to designate the evaluation items for calculating a storefront achievement ratio. Moreover, this request may further include a passing level of the respective evaluation items for evidence. This allows the manufacturer to set the evaluation criteria for calculating the storefront achievement ratio. Moreover, this request may further include the content and procedure of the promotion work (such as the place where the product is placed in the store, how to display the product at the place where the product is placed, the place where the point of purchase is placed in the store), and the appealing points of the product. The content and procedure of the promotion work and the appealing points of the product can be used to generate the instruction described below. Note that, in the present specification, the storefront achievement ratio refers to the percentage of the store or the promotion work performed at the store that satisfies the predetermined conditions designated by the manufacturer.

In response to receiving the request from the manufacturer, and based at least on the product information included in the request, an instruction that at least describes promotion work is generated at the intermediary company. The instruction may be generated based further on the content and procedure of the promotion work as well as the appealing points of the product included in the request. In this way, it is possible to reflect the content and procedure of the promotion work designated by the manufacturer and the appealing points of the product designated by the manufacturer in the instruction. If the product information included in the request includes a product image (i.e., a still image and/or a video), the instruction may be generated so that the product image can be reflected in the content and procedure of the promotion work. The instruction may be generated manually or may be generated automatically.

Step S002: The intermediary company delivers the instruction that at least describes the promotion work, to the retail company. If the request sent at Step S001 includes the designation of the retail company, the instruction that at least describes the promotion work is delivered to the retail company that the manufacturer designates.

Step S003: The retail company sends, to the intermediate company, one or more evidences that show the results of the promotion work performed by the retail company according to the instruction delivered. The one or more evidences include a reading completion percentage of the instruction (e.g., an actual-result value of page display (such as the ratio of the number of pages displayed or viewed by a user (store employee) to the total number of pages), an actual-result value of videos played (such as the number of videos played or the number of videos played for a specified period of time or longer), the ratio of check entries in the checkboxes to indicate understanding of the procedure), and one or more images (e.g., still images and videos) captured at one or more stores. The one or more evidences may further include a file (e.g., an Excel file) in which the respective actual-result values are entered. Each of the one or more images includes location information about where each of the one or more images is captured and time information about when each of the one or more images is captured.

The intermediary company calculates the degree of achievement of the promotion work at the retail company to which the instruction has been delivered, based on the one or more evidences sent at Step S003. This makes it possible to manage whether the promotion work as requested by the manufacturer is performed at the retail company (such as, to collect data on the promotion work), without the manufacturer itself, or an investigation company commissioned by the manufacturer, needing to investigate the retail company.

At Step S002 when the instruction is delivered to the retail company, the retail company may also deliver the instruction to one or more stores that the retail company manages. For example, if the request sent at Step S001 includes the designation of the region where the promotion work is to be performed, the retail company may deliver the instruction only to the stores within the designated region.

The degree of achievement of promotion work in a retail company is calculated, for example, as the storefront achievement ratio of a retail company, but is not limited to this. The storefront achievement ratio of the retail company is represented by $N_1/N_2$, where $N_1$ is the number of stores in which the promotion work satisfying the passing level set by the manufacturer has been performed within a predetermined period among the number of one or more stores to which the instruction has been delivered. $N_2$ is the number of one or more stores to which the instruction has been delivered. The passing level is set according to the instruction. In this way, the intermediary company can calculate the storefront achievement ratio of the retail company based on the one or more evidences sent at Step S003. This makes it possible to manage whether the promotion work as requested by the manufacturer is performed at one or more stores to which the instruction has been delivered, without the manufacturer itself, or an investigation company commissioned by the manufacturer, needing to investigate the one or more stores to which the instruction has been delivered among multiple stores of the retail company.

Step S004: The intermediary company allows both the manufacturer and the retail company to share the degree of achievement of the promotion work at the retail company.

This allows both the manufacturer and the retail company to view the degree of achievement of the promotion work at the retail company, and this allows calculating of an appropriate promotion cost with high accuracy based on the degree of achievement of the promotion work at the retail company.

In addition, the manufacturer and/or retail company may calculate the promotion cost based on the degree of achievement of the promotion work at the retail company.

Furthermore, the intermediary company may calculate the usage fee for using an intermediate device of the intermediary company based on the actual results of the past promotion work at the retail company. Alternatively, the intermediary company may calculate the usage fee for using the intermediate device of the intermediary company based on the delivery conditions of an instruction X (e.g., the number of retail companies to which the instruction has been delivered, and the passing level of respective evaluation items of respective evidences). The intermediary company then charges the manufacturer a usage fee to use the intermediate device of the intermediary company.

Step S005: The manufacturer pays the retail company the promotion cost calculated based on the degree of achievement of the promotion work at the retail company. This payment may be made in any manner.

In addition, the manufacturer pays the intermediary company a usage fee to use the intermediary device of the intermediary company. This payment may also be made in any manner.

In this way, the promotion cost paid by the manufacturer to the retail company can be calculated based on an objective index (i.e., the degree of achievement of the promotion work at the retail company), and as a result, the manufacturer does not have to pay the promotion cost to the retail company in advance, and can avoid paying the retail company unnecessary promotion cost.

In the embodiment shown in FIG. 1, the example in which the manufacturer and/or the retail company calculates the promotion cost has been described; however, the present invention is not limited to this. For example, the intermediary company may calculate the promotion cost.

For example, the intermediary company may calculate the promotion cost that the manufacturer should pay to the retail company based on the degree of achievement of the promotion work at the retail company. This makes it possible to fairly calculate the promotion cost from the standpoint of a third party, the intermediary company.

In the embodiment shown in FIG. 1, the example in which the manufacturer pays the promotion cost directly to the retail company has been described; however, the present invention is not limited to this. For example, by executing Steps S004' to S006' described below after executing Step S003, the intermediate company may mediate the payment of the promotion cost from the manufacturer to the retail company.

Step S004': The intermediary company sends a collection request for collecting the promotion cost to the manufacturer and charges the manufacturer a usage fee to use the intermediate device of the intermediary company.

Step S005': The manufacturer pays the promotion cost to the intermediary company in response to the collection request from the intermediary company. In addition, the manufacturer pays the intermediary company a usage fee for using the intermediary device of the intermediary company in response to the charge from the intermediary company.

Step S006': The intermediary company pays the retail company the amount of promotion cost minus the brokerage fee.

2. Configuration of Computer System to Achieve New Business Model

FIG. 2 shows an example of the configuration of a computer system 200 to achieve the new business model described above.

The computer system 200 includes: an intermediary device 210 for executing the processing for an intermediary company; terminal devices $220_1$-$220_N$ for executing the processing for a manufacturer; and managing devices $230_1$-$230_N$ for executing the processing for a retail company. The intermediary device 210 is configured to be able to communicate, via an Internet 240, with each of the terminal devices $220_1$-$220_N$ of the manufacturer and with each of the managing devices $230_1$-$230_M$ of the retail company. Here, N and M are each an integer greater than or equal to 1.

In the example shown in FIG. 2, the intermediary device 210 includes: an interface unit 211; a processor unit 212 including one or more CPUs (Central Processing Unit); and a memory unit 213. The hardware configuration of the intermediary device 210 may be, without particular limitation, any hardware configuration that is able to achieve the functions thereof, and the hardware configuration may be configured with a single machine or may be configured by combining a plurality of machines.

The interface unit 211 controls communication between each of the terminal devices $220_1$-$220_N$ of the manufacturer and each of the managing devices $230_1$-$230_M$ of the retail company.

The memory unit 213 stores the program required to execute processing, the data required to execute the program, and the like. Here, the present invention does not consider how to store the program on the memory unit 213. For example, the program may be pre-installed on the memory unit 213. Alternatively, the program may be installed on the memory unit 213 by being downloaded over a network such as the Internet 240, or the program may be installed on the memory unit 213 via a storage medium such as an optical disc or USB.

The processor unit 212 controls the operation of the overall intermediary device 210. The processor unit 212 reads the program stored in the memory unit 213 and executes the program. This allows the intermediary device 210 to function as a device and/or means that performs desired steps.

The intermediary device 210 is connected to a database unit 250. The database unit 250 includes a manufacturer database unit 251, a product database unit 252, a retail company database unit 253, an instruction database unit 254, and a work result database unit 255.

Each of the terminal devices $220_1$-$220_N$ of the manufacturer and each of managing devices $230_1$-$230_M$ of the retail company are configured to be able to communicate with the intermediary device 210 via the Internet 240. For example, each of the terminal devices $220_1$-$220_N$ of the manufacturer may be any type of computer with a communication interface (e.g., mobile wireless terminals such as mobile phones, smartphones, tablet terminals, smart glasses and smart watch terminals, or personal computers such as desktop PCs, laptop PCs, and notebook PCs, or computer systems that function as a server).

In the embodiment shown in FIG. 2, the intermediary device 210 has been described to be able to communicate with each of the terminal devices $220_1$-$220_N$ of the manufacturer and each of the managing devices $230_1$-$230_M$ of the retail company via the Internet 240; however, the present invention is not limited to this. It is also possible to use any type of network instead of the Internet 240. Furthermore, in the embodiment shown in FIG. 2, the communication between the constituent elements included in the computer system 200 is achieved via the same network (i.e., the Internet 240); however, the present invention is not limited to this. The communication between the constituent elements included in the computer system 200 may be achieved via the same network, may be achieved via separate networks that are partly different, or may be achieved via separate networks that are all different.

Furthermore, in the embodiment shown in FIG. 2, the database unit 250 is provided outside the intermediary device 210; however, it may be provided in any manner. For example, the database unit 250 may be configured as a single external hard disk device for the intermediary device 210 or may be configured as storage on the cloud connected over the network. Alternatively, it is possible for the database unit 250 to be provided inside the intermediary device 210. The configuration of the database unit 250 is not limited to any particular hardware configuration. For example, the database unit 250 may be configured with a single hardware component or multiple hardware components. Furthermore, the configuration of the respective database units included in the database unit 250 is not limited to any particular hardware configuration either. For example, the respective database units included in the database unit 250 may also be configured with a single hardware component or multiple hardware components.

FIG. 3A shows an example of the structure of the information stored in the manufacturer database unit 251.

The manufacturer database unit 251 stores information about the manufacturer. The information about the manufacturer can be identified by the information for identifying the manufacturer (manufacturer ID). In the embodiment shown in FIG. 3A, the information about the manufacturer includes, for example, the manufacturer's name, address, and so on.

FIG. 3B shows an example of the structure of the information stored in the product database unit 252.

The product database unit 252 stores information about a product of the manufacturer. The information about a product of the manufacturer can be identified by the information for identifying the product (product ID). In the embodiment shown in FIG. 3B, the information about a product of the manufacturer includes, for example, the product name, suggested selling price, appealing points, sales time, and so on.

FIG. 3C shows an example of the structure of the information stored in the retail company database unit 253.

The retail company database unit 253 stores information about the retail company. The information about the retail company can be identified by the information for identifying the retail company (retail company ID). In the embodiment shown in FIG. 3C, the information about the retail company further includes, for example, retail company's name, address and industry type, the number of stores managed, location information about the stores managed, actual results of past promotion work (e.g., the cumulative number of instances of promotion work that have exceeded the passing level, the ratio of the number of instances of promotion work that have exceeded the passing level to the total number of instances of promotion work performed in the past, the period from the start of delivery of the instruction to the completion of the promotion work described in the instruction (speed), the quality of the promotion work (e.g., the capturing angle of the images included in the evidence, the presence or absence of designated products in the images included in the evidence, the number of the designated products in the images included in the evidence, and the presence or absence of a designated point of purchase in the images included in the evidence)), the degree of overall achievement of the retail company, the unit cost of the promotion cost, and the like. The degree of overall achievement of the retail company includes, but is not limited to, an overall storefront achievement ratio (e.g., the average value of all storefront achievement ratios calculated in the past, or the most recently calculated average vale of a given number of storefront achievement ratios), and the total number of storefront achievements (for example, the number of the storefront achievements of the retail company is, for example, the cumulative total number of evaluation items that satisfy the passing level set by the manufacturer as a result of the past promotion work performed at the stores that the retail company manages). [0065]

FIG. 3D shows an example of the structure of the information stored in the instruction database unit 254.

The instruction database unit 254 stores information about the instruction. The information about the instruction can be identified by the information for identifying the instruction (instruction ID). In the embodiment shown in FIG. 3D, the information about the instruction includes, for example, the unit cost of delivery cost, the content and procedure of promotion work, appealing points of products, one or more evaluation items of one or more evidences, the passing level of the respective evaluation items of the respective evidences, location information about the store that performs the promotion work, and the like. The information about the instruction is associated with the information for identifying the manufacturer that wishes to sell the product (manufacturer ID), the information for identifying the retail company to which the instruction has been delivered (retail company ID), and the information for identifying the product (product ID). The associating of the instruction ID with the product ID allows recognizing of the information about the product described in the instruction identified by the instruction ID. The respective evaluation items of evidences can be determined for each evidence. In addition, the passing level of the evaluation items can be determined for each evaluation item.

FIG. 3E shows an example of the structure of the information stored in the work result database unit 255.

The work result database unit 255 stores information about a work result of the promotion work performed according to the instruction. The information about the work result can be identified by the information for identifying the work result (work result ID). The information about the work result is associated with the information for identifying the instruction (instruction ID), and the information for identifying the retail company that has performed the promotion work (retail company ID). In the embodiment shown in FIG. 3E, the information about the work result includes the delivery scale of the instruction, evidence, actual results of promotion work, the degree of achievement of the promotion work at the retail company, and the like. The degree of achievement of the promotion work at the retail company is, for example, the storefront achievement ratio of the retail company to which the instruction identified by the instruction ID has been delivered, or the number of storefront achievements of the retail company to which the instruction identified by the instruction ID has been delivered; however, the degree of achievement is not limited to them.

The delivery scale of the instruction includes but is not limited to, for example, the region where the promotion work has been performed, the period for which the promotion work has been performed, and the total number of retail companies that have performed the promotion work. The evidence includes, but is not limited to, for example, a reading completion percentage of the instruction, and one or more images captured at one or more stores of the retail company identified by the retail company ID. The actual results of the promotion work include, but are not limited to, for example, the number of instances of promotion work that have exceeded the passing level, the ratio of the number of instances of promotion work that have exceeded the passing level to the total number of instances of promotion work, the period from the start of delivery of the instruction identified by the instruction ID to the completion of the promotion work described in the instruction (speed), the quality of the promotion work (e.g., the capturing angle of the images included in the evidence, the presence or absence of designated products in the images included in the evidence, the number of the designated products in the images included in the evidence, and the presence or absence of a designated point of purchase in the images included in the evidence). The storefront achievement ratio of the retail company to which the instruction identified by the instruction ID has been delivered is represented by, for example, $N_1/N_2$, where: $N_1$ is the number of stores at which the promotion work that satisfies the passing level set by the manufacturer has been performed within a given period, within the number of one or more stores to which the instruction has been delivered; and $N_2$ is the number of the one or more stores to which the instruction has been delivered. The number of storefront achievements of the retail company to which the instruction identified by the instruction ID has been delivered is, for example, the number of evaluation items that satisfy the passing level set by the manufacturer as a result of the promotion work performed at the stores managed by the retail company to which the instruction identified by the instruction ID has been delivered; however, the present invention is not limited to this.

3. Processing by the Intermediary Device

FIG. 4 shows an example of the flow of the processing executed by the intermediary device 210. The respective steps shown in FIG. 4 are executed by the processor unit 212 included in the intermediary device 210. Hereinafter, the respective steps shown in FIG. 4 will be described in detail.

Step S401: a request for promotion from a terminal device 220$_1$ of the manufacturer is received. The request for promotion includes, for example, at least information about a product, which designates the product that the manufacturer wishes to sell. The information of the product may include an image of the product. The request for promotion may further include the content and procedure of the promotion work that the manufacturer designates.

The request for promotion may further include the name of the retail company that performs promotion work and/or the scale of the promotion work to be performed, which allows the manufacturer to designate the retail company selling the product that the manufacturer wishes to sell and/or the area in which and period for which the promotion of the product is performed.

The request for promotion may further include evaluation items of evidence (such as whether or not the angle at which the image is captured matches the designated angle, whether or not the designated product is shown, whether or not the designated number of the designated products are displayed, and whether or not the designated point of purchase is placed), which allows the manufacturer to designate the evaluation items to calculate the degree of achievement (such as the storefront achievement ratio or the number of storefront achievements).

The request for promotion may further include a passing level of the respective evaluation items of evidence, which allows the manufacturer to set the evaluation criteria for calculating the degree of achievement (such as the storefront achievement ratio or the number of storefront achievements).

The request for promotion may further include appealing points of the product, which makes it possible to reflect the appealing points of the product in the instruction described below.

Step S402: An instruction X that at least describes the promotion work is generated based on the request for promotion received at Step S401 (that is, based at least on the information about the product). The instruction X may be generated manually or may be generated automatically. If the information about the product includes an image of the product (i.e., a still image and/or a video), the instruction X is generated in such a manner to reflect the image of the product. Once the instruction X is generated, the information for identifying the instruction X (instruction ID) is automatically assigned.

If the request for promotion includes the content and procedure of the promotion work, the instruction X is generated in such a manner to reflect the content and procedure of the promotion work (e.g., the content and procedure of the promotion work in a step format). If the request for promotion includes appealing points of the product, the instruction X is generated in such a manner to reflect the appealing points of the product.

If the request for promotion includes the name of the retail company that performs the promotion work, the evaluation items of evidence, and the passing level of the respective evaluation items of evidence, then the information for identifying the retail company that performs the promotion work (retail company ID), the evaluation items of evidence, and the passing level of the respective evaluation items of evidence are stored on the instruction database unit 254 while being associated with the information for identifying the instruction X (instruction ID) generated at Step S402.

If the request received at Step S401 includes a retail company designation, then Steps S403 to S405 described below may be omitted.

Step S403: recommendation information indicating recommendation for transactions with at least one retail company is generated based on the information included in the request for promotion. The information about at least one recommended retail company is recognized by reference to, for example, the retail company database unit 253 (e.g., industry type, actual results of past promotion work, and the degree of overall achievement). For example, if the information of the product included in the request is related to some pharmaceutical product, the top three degrees of overall achievement by the retail companies of the industry type that cells pharmaceutical products may be recognized as the information about at least one retail company included in the recommendation information; however, the present invention is not limited to this.

Step S404: The recommendation information generated at Step S403 is sent to the terminal device 220$_1$ of the manufacturer.

Step S405: The information indicating the retail company selected by the manufacturer (hereinafter, referred to as the "retail company A" in the present specification) is received from the terminal device 220$_1$ of the manufacturer.

In the following description, it is assumed that the destination of the instruction X that the manufacturer wishes to deliver to, is designated or selected as the retail company A by the manufacturer.

Step S406: The instruction X generated at Step S402 is delivered to the managing device $230_1$ of the retail company A. The instruction X is delivered to one or more stores of the retail company A via the managing device of the retail company A. If the scale of promotion work is designated in the request received at Step S401, the instruction X is delivered to one or more stores of the retail company A according to the designated scale.

Step S407: One or more evidences indicating the results of the promotion work performed at one or more stores managed by the retail company A according to the instruction X are received from managing device $230_1$ of the retail company A.

One or more evidences received at Step S407 include a reading completion percentage of the instruction, and one or more images captured at one or more stores of the retail company A. Examples of the reading completion percentage of the instruction include, but are not limited to, an actual-result value of page display, an actual-result value of videos played, the ratio of check entries in the checkboxes to indicate understanding of the procedure, or a combination thereof. The actual-result value of page display is, for example, the ratio of the number of pages displayed or viewed by a user (store employee) to the total number of pages; however, the present invention is not limited to this. The actual-result value of videos played is, for example, the number of videos played or the number of videos played for a specified period of time or longer; however, the present invention is not limited to this. Each of one or more images may include the location information about each of the one or more images is captured and time information about when each of the one or more images is captured.

Step S408: When one or more evidences are received at Step S407, the one or more evidences are stored and accumulated in the work result database unit 255 while being associated with the instruction X.

The work result database unit 255 is configured to be viewable by both the manufacturer and the retail company A. This allows the manufacturer and retail company A to view the progress of the promotion work described in the instruction X (such as the actual results of the promotion work).

After receiving one or more evidences at Step S407, the intermediary device 210 may immediately store the one or more evidences on the work result database unit 255. This allows both the manufacturer and the retail company A to keep track of the progress of the promotion work described in the instruction X (for example, the actual results of the promotion work) in real time.

Step S409: The degree of achievement of the promotion work (described in the instruction X) at the retail company A is calculated based on the one or more evidences received at Step S407.

Examples of the degree of achievement of the promotion work at the retail company A include the storefront achievement ratio of the retail company A, and the storefront achievement ratio of the retail company A is represented by, for example, $N_1/N_2$, where $N_1$ is the number of stores in which the promotion work satisfying the passing level set by the manufacturer has been performed within a predetermined period among the number of one or more stores to which the instruction X has been delivered, and $N_2$ is the number of one or more stores to which the instruction X has been delivered. The passing level set by the manufacturer may be a passing level (threshold value) of respective evaluation items of the respective evidences and may be a passing level included in the request for promotion. Whether the promotion work satisfies the passing level set by the manufacturer is determined automatically by the intermediary device 210. The respective evaluation items of the respective evidences are set by the manufacturer according to the promotion work, and thus, they are set according to the instruction that describes the content and procedure of the promotion work.

The passing level set by the manufacturer is related to, for example, an actual-result value of page display, an actual-result value of videos played, the ratio of check entries in the checkboxes to indicate understanding of the procedure, the capturing angle of the images included in the evidence, the presence or absence of designated products in the images included in the evidence, the number of designated products in the images included in the evidence, the presence or absence of a designated point of purchase in the images included in the evidence, match/mismatch between capturing location information included in the images included in the evidence (e.g., location information represented by latitude and longitude) and location information of one or more stores to which the instruction X has been delivered, match/mismatch between capturing time information included in the images included in the evidence and capturing time zone designated by the manufacturer. The capturing location information included in the images included in the evidence and the capturing time information included in the images included in the evidence may also be, for example, Exif (Exchangeable image file format) information.

The capturing angle of the images, presence or absence of designated products in the images, the number of designated products in the images, the presence or absence of a designated point of purchase in the images, etc. are recognized and distinguished by, for example, the intermediary device 210 analyzing the images included in the evidence.

Another example of the degree of achievement of the promotion work at the retail company A is the number of storefront achievements of the retail company A, and the number of storefront achievements of the retail company A is, for example, the cumulative number of the evaluation items that satisfy the passing level set by the manufacturer as a result of the promotion work performed at the stores managed by the retail company A; however, the present invention is not limited to this.

Step S410: The degree of achievement calculated at Step S409 is stored and accumulated in the work result database unit 255 while being associated with the instruction X.

After calculating the degree of achievement at Step S409, the intermediary device 210 may immediately store the degree of achievement on the work result database unit 255. This allows both the manufacturer and the retail company A to keep track of the degree of achievement of the retail company A in real time.

After Step S410, the intermediary device 210 may: update the retail company database unit 253 so as to reflect the one or more evidences received at Step S407 and the degree of achievement calculated at Step S409 on the information regarding the retail company A in the retail company database unit 253; generate recommendation information indicating recommendation for transactions with at least one retail company among multiple retail companies, based on the updated information regarding the retail company A in the retail company database unit 253; and notify the manufacturer of the recommendation information (that is, send the recommendation information to the terminal device $220_1$ of the manufacturer). This allows the manufacturer to decide, for example, whether to continue transactions with the retail company A (i.e., the sales of the products at the retail company A).

FIG. 5 shows another example of the flow of the processing executed on the intermediary device 210. The processing shown in FIG. 5 is an example of the processing executed when the intermediary company mediates the promotion cost (that is, if the intermediary company does not mediate the promotion cost, the processing shown in FIG. 5 will not be executed). In the embodiment shown in FIG. 5, it is assumed that the promotion work described in the instruction X is performed at the retail company A (that is, one or more stores managed by the retail company A). The respective steps shown in FIG. 5 are executed by the processor unit 212 included in the intermediary device 210. Hereinafter, respective steps shown in FIG. 5 will be described in detail.

Step S501: The promotion cost to be paid by the manufacturer to the retail company is determined based on the degree of achievement of the promotion work at the retail company A. This processing is executed by referring to, for example, the work result database unit 255 and/or retail company database unit 253. For example, the promotion cost of the retail company A is calculated using the following equation: (the promotion cost of the retail company A)=(the number of stores managed by the retail company A) x (the degree of achievement of the promotion work at the retail company A)×(the unit cost of the promotion cost of the retail company A in the retail company database unit 253).

Step S502: The processing is executed to collect the promotion cost determined at Step S501 from the manufacturer. Examples of this processing include, but are not limited to, the processing to generate a flag to collect the promotion cost determined at Step S501 from the manufacturer, and the processing to send a request to collect the promotion cost determined at Step S501 to the terminal device $220_1$ of the manufacturer. This step corresponds to Step S004 shown in FIG. 1.

Step S503: After the promotion cost to be paid to the retail company A is received from the manufacturer, the processing is executed to pay at least part of the promotion cost from the manufacturer to the retail company A. Examples of this processing include, but are not limited to, the processing of calculating the actual payment amount from the intermediate company to the retail company A by subtracting the brokerage fee of the intermediate company from the promotion cost to be paid to the retail company A.

FIG. 6 shows another example of the flow of the processing executed on the intermediary device 210. In the embodiment shown in FIG. 6, it is assumed that the promotion work described in the instruction X is performed at the retail company A (that is, one or more stores managed by the retail company A). The respective steps shown in FIG. 6 are executed by the processor unit 212 included in the intermediary device 210. Hereinafter, the respective steps shown in FIG. 6 will be described in detail.

Step S601: The usage fee for using the intermediary device 210 is determined based on the actual results of past promotion work at the retail company A and/or the delivery conditions for the instruction X (such as the number of retail companies (including the retail company A) to which the instruction X has been delivered, and the passing level of the respective evaluation items of the respective evidences). This processing is performed by, for example, referring to the retail company database unit 253 and/or the instruction database unit 254. For example, the usage fee for using the intermediary device 210 may also be determined by referring to a correspondence table (not shown) of the "actual results of past promotion work at the retail company A" and/or "delivery conditions for the instruction X" with the "usage fee for using the intermediary device 210". The usage fee for using the intermediary device 210 includes, but is not limited to, for example, a delivery cost for delivering the instruction X to the retail company A and a brokerage fee.

Determining the usage fee for using the intermediary device 210 based on the actual results of past promotion work at the retail company A and/or the delivery conditions for the instruction X includes, for example, determining the rate for the delivery cost for delivering the instruction X to the retail company A based on the actual results of past promotion work at the retail company A and/or the delivery conditions for the instruction X, and determining the delivery cost for delivering the instruction X to the retail company A based on the determined rate. For example, the rate for the delivery cost for delivering the instruction X to the retail company A may also be determined by referring to a correspondence table (not shown) between the "ratio of the number of instances of promotion work that exceed the passing level to the total number of instances of promotion work performed in the past" and the "rate for the delivery cost". Alternatively, the rate for the delivery cost for delivering the instruction X to the retail company A may also be determined by referring to a correspondence table (not shown) between the "quality of the promotion work" and the "rate for the delivery cost". When the usage fee for using the intermediary device 210 is determined based on the actual results of past promotion work at the retail company A and/or the delivery conditions for the instruction X, it is possible to create a prepaid-type service. This is because the usage fee for using the intermediary device 210 can be calculated before the instruction X is delivered.

Alternatively, the usage fee for using the intermediary device 210 may be determined based on the degree of achievement of the promotion work at the retail company A. This processing is executed by, for example, referring to the work result database unit 255. For example, the usage fee for using the intermediary device 210 may also be determined by referring to a correspondence table (not shown) between the "degree of achievement of the promotion work at the retail company A" and the "usage fee for using the intermediary device 210". Determining the usage fee for using the intermediary device 210 based on the degree of achievement of the promotion work at the retail company A includes, for example, determining the rate for the delivery cost for delivering the instruction X to the retail company A based on the degree of achievement of the promotion work at the retail company A, and determining the delivery cost for delivering the instruction X to the retail company A based on the determined rate. For example, the rate for the delivery cost for delivering the instruction X to the retail company A may also be determined by referring to a correspondence table (not shown) between the "degree of achievement of the promotion work at the retail company A" and the "rate for the delivery cost". When the usage fee for using the intermediary device 210 is determined based on the degree of achievement of the promotion work at the retail company A, it is possible to create a postpaid-type service. This is because the usage fee for using the intermediary device 210 can be calculated after the promotion work is performed according to the instruction X at the retail company A.

The processing to determine the delivery cost for delivering the instruction X to the retail company A based on the determined rate is executed by, for example, referring to the instruction database unit 254 and/or the work result database unit 255. For example, the delivery cost for delivering the instruction X to the retail company A may be calculated by the product of the "unit cost of the delivery cost" and the "rate determined based on the actual results of past promotion work at the retail company A and/or the delivery conditions for the instruction X", or the product of the "unit cost of the delivery cost" and the "rate for the delivery cost determined based on the degree of achievement of the promotion work at the retail company A".

The rate for the delivery cost determined based on the actual results of past promotion work at the retail company A and/or the delivery conditions for the instruction X may differ from the rate for the delivery cost determined based on the degree of achievement of the promotion work at the retail company A. For example, the rate for the delivery cost determined based on the actual results of past promotion work at the retail company A and/or the delivery conditions for the instruction X is higher than the rate for the delivery cost determined based on the degree of achievement of the promotion work at the retail company A.

Step S602: The processing is executed to charge the manufacturer for the usage fee for using the intermediary device 210 determined at Step S601. Examples of this processing include, but are not limited to, the processing to generate a flag to charge the manufacturer for the usage fee for using the intermediary device 210 determined at Step S601, and the processing to send the invoice for the usage fee for using the intermediary device 210 determined at Step S601 to the terminal device 220₁ of the manufacturer. This step corresponds to Step S004 shown in FIG. 1.

In the embodiments described with reference to FIGS. 4 to 6, examples have been described in which the instruction X is delivered only to the retail company A; however, the present invention is not limited to these examples. The number of the retail companies to which the instruction X is delivered is any number greater than or equal to 1, and the number may also be designated by manufacturer. In addition, the number of the instruction that is delivered to the retail companies is also any number greater than or equal to 1.

In the embodiments described with reference to FIGS. 4 to 6, examples have been described in which the processing of the respective steps shown in FIGS. 4 to 6 is achieved by the processor unit executing the program stored on the memory unit; however, the present invention is not limited to these examples. The processing of at least some of the respective steps shown in FIGS. 4 to 6 may also be achieved by a hardware configuration such as control circuitry.

While the present invention has been illustrated with preferred embodiments of the present invention as above, the present invention should not be construed as being limited to these embodiments. It is understood that the present invention should be interpreted only by the scope of the claims of the present invention. It will be understood by those skilled in the art that from the description of specific preferred embodiments of the present invention, an equivalent range can be implemented based on the description of the present invention and common general technical knowledge.

INDUSTRIAL APPLICABILITY

The present invention is useful for providing: a device capable of aggregating and managing (such as aggregating and managing in real time) whether the promotion work as requested by the manufacturer is performed at the retail company (such as whether the products are displayed at the stores of the retail company as requested by the manufacturer, or whether the products are explained at the stores of the retail company as requested by the manufacturer), without the manufacturer itself, or an investigation company commissioned by the manufacturer, needing to conduct a field survey of the promotion work performed at the retail company (for example, without the staff of the investigation company needing to visit a store of the retail company and checking the display status etc. of the products at the store); a program executed on the device, and the like.

DESCRIPTION OF THE REFERENCE NUMERALS

200 computer system
210 intermediary device
220₁-220ₙ terminal devices of the manufacturer
230₁-230ₘ managing devices of the retail company
240 Internet
250 database unit

The invention claimed is:

1. A system for managing promotion work of a product that a manufacturer wishes to sell, the system comprising:
a managing device managed by a retail company that sells the product, the managing device comprising a computer;
an intermediary device configured to be able to communicate with the managing device, the intermediary device comprising a processor unit; and
at least one camera at one or more stores of the retail company,
wherein:
the intermediary device delivers an instruction that at least describes promotion work for promoting a sale of the product, to the managing device;
the managing device delivers the instruction to the one or more stores according to the instruction;
the at least one camera captures, according to the instruction, one or more evidences showing a result of the promotion work performed at the one or more stores according to the instruction and sends the one or more evidences to the managing device;
the intermediary device receives the one or more evidences from the managing device; and
the intermediary device analyzes one or more images included in the one or more evidences to identify at least one of: a capturing angle of the one or more images, a presence or absence of designated products in the one or more images, the number of designated products in the one or more images, or a presence or absence of a designated point of purchase in the one or more images, and calculates a degree of achievement of the promotion work at the retail company based at least in part on an analysis result of the one or more images and the instruction, wherein:
the degree of achievement of the promotion work at the retail company includes a storefront achievement ratio of the retail company; and
the storefront achievement ratio of the retail company is represented by $N_1/N_2$, where $N_1$ is the number of stores in which the promotion work satisfying a passing level set by the manufacturer has been performed within a predetermined period among the number of the one or more stores to which the instruction has been delivered, $N_2$ is the number of the one or more stores to which the instruction has been delivered, and the passing level is set in accordance with the instruction.

2. The system according to claim 1, wherein the intermediary device further:
    determines a promotion cost to be paid by the manufacturer to the retail company based on the degree of achievement of the promotion work at the retail company; and
    executes processing to collect the promotion cost from the manufacturer.

3. The system according to claim 2, wherein the intermediary device further executes processing to pay at least part of the promotion cost from the manufacturer to the retail company.

4. The system according to claim 1,
    wherein the intermediary device is connected to a database unit, and
    wherein the intermediary device further accumulates the degree of achievement of the promotion work at the retail company on the database unit immediately after the degree of achievement of the promotion work at the retail company is calculated.

5. The system according to claim 4, wherein the database unit is configured to be viewable by both the manufacturer and the retail company.

6. The system according to claim 1,
    wherein the intermediary device is connected to a database unit, and
    wherein the intermediary device further accumulates the one or more evidences on the database unit immediately after the one or more evidences is received.

7. A system for managing promotion work of a product that a manufacturer wishes to sell, the system comprising:
    a managing device managed by a retail company that sells the product, the managing device comprising a computer;
    an intermediary device configured to be able to communicate with the managing device, the intermediary device comprising a processor unit; and
    at least one camera at one or more stores of the retail company,
    wherein:
    the intermediary device delivers an instruction that at least describes promotion work for promoting a sale of the product, to the managing device;
    the managing device delivers the instruction to the one or more stores according to the instruction;
    the at least one camera captures, according to the instruction, one or more evidences showing a result of the promotion work performed at the one or more stores according to the instruction and sends the one or more evidences to the managing device;
    the intermediary device receives the one or more evidences from the managing device;
    the intermediary device analyzes one or more images included in the one or more evidences to identify at least one of: a capturing angle of the one or more images, a presence or absence of designated products in the one or more images, the number of designated products in the one or more images, or a presence or absence of a designated point of purchase in the one or more images, and calculates a degree of achievement of the promotion work at the retail company based at least in part on an analysis result of the one or more images and the instruction;
    the intermediary device determines a usage fee for using the intermediary device based on an actual result of past promotion work at the retail company; and
    the intermediary device executes processing to charge the manufacturer for the usage fee.

8. The system according to claim 7,
    wherein the usage fee includes a delivery cost for delivering the instruction to the retail company, and
    wherein the intermediary device determines the usage fee by:
    determining a rate for the delivery cost based on the actual result of the past promotion work at the retail company; and
    determining the delivery cost based on the rate.

9. A system for managing promotion work of a product that a manufacturer wishes to sell, the system comprising:
    a managing device managed by a retail company that sells the product, the managing device comprising a computer;
    an intermediary device configured to be able to communicate with the managing device, the intermediary device comprising a processor unit; and
    at least one camera at one or more stores of the retail company,
    wherein:
    the intermediary device delivers an instruction that at least describes promotion work for promoting a sale of the product, to the managing device;
    the managing device delivers the instruction to the one or more stores according to the instruction;
    the at least one camera captures, according to the instruction, one or more evidences showing a result of the promotion work performed at the one or more stores according to the instruction and sends the one or more evidences to the managing device;
    the intermediary device receives the from the managing device;
    the intermediary device analyzes one or more images included in the one or more evidences to identify at least one of: a capturing angle of the one or more images, a presence or absence of designated products in the one or more images, the number of designated products in the one or more images, or a presence or absence of a designated point of purchase in the one or more images, and calculates a degree of achievement of the promotion work at the retail company based at least in part on an analysis result of the one or more images and the instruction;
    the intermediary device determines a usage fee for using the intermediary device based on the degree of achievement of the promotion work at the retail company, wherein retail companies to which the instruction has been delivered include the retail company; and
    the intermediary device executes processing to charge the manufacturer for the usage fee.

10. The system according to claim 9,
    wherein the usage fee includes a delivery cost for delivering the instruction to the retail company, and
    wherein the intermediary device determines the usage fee by:
    for determining a rate for the delivery cost based on the degree of achievement of the promotion work at the retail company; and
    for determining the delivery cost based on the rate.

11. A system for managing promotion work of a product that a manufacturer wishes to sell, the system comprising:

a managing device managed by a retail company that sells the product, the managing device comprising a computer;
an intermediary device configured to be able to communicate with the managing device, the intermediary device comprising a processor unit; and
at least one camera at one or more stores of the retail company,
wherein the intermediary device is connected to a database unit, the database unit including stored thereon the degree of achievement of promotion work at each of a plurality of retail companies, and the retail company being one of the plurality of retail companies,
wherein:
the intermediary device delivers an instruction that at least describes promotion work for promoting a sale of the product, to the managing device;
the managing device delivers the instruction to the one or more stores according to the instruction;
the at least one camera captures, according to the instruction, one or more evidences showing a result of the promotion work performed at the one or more stores according to the instruction and sends the one or more evidences to the managing device;
the intermediary device receives the from the managing device;
the intermediary device analyzes one or more images included in the one or more evidences to identify at least one of: a capturing angle of the one or more images, a presence or absence of designated products in the one or more images, the number of designated products in the one or more images, or a presence or absence of a designated point of purchase in the one or more images, and calculates a degree of achievement of the promotion work at the retail company based at least in part on an analysis result of the one or more images and the instruction;
the intermediary device generates recommendation information indicating recommendation for a transaction with at least one retail company of the plurality of retail companies based on the degree of achievement of the promotion work at each of the plurality of retail companies; and
the intermediary device notifies the manufacturer of the recommendation information.

12. A system for managing promotion work of a product that a manufacturer wishes to sell, the system comprising:
a managing device managed by a retail company that sells the product, the managing device comprising a computer;
an intermediary device configured to be able to communicate with the managing device, the intermediary device comprising a processor unit; and
at least one camera at one or more stores of the retail company,
wherein:
the intermediary device delivers an instruction that at least describes promotion work for promoting a sale of the product, to the managing device;
the managing device delivers the instruction to the one or more stores according to the instruction;
the at least one camera captures, according to the instruction, one or more evidences showing a result of the promotion work performed at the one or more stores according to the instruction and sends the one or more evidences to the managing device, wherein each of the one or more evidences includes a reading completion percentage of the instruction and one or more images captured at the one or more stores, each of the one or more images including location information about where each of the one or more images is captured and time information about when each of the one or more images is captured;
the intermediary device receives the one or more evidences from the managing device;
the intermediary device analyzes the one or more images to identify at least one of: a capturing angle of the one or more images, a presence or absence of designated products in the one or more images, the number of designated products in the one or more images, or a presence or absence of a designated point of purchase in the one or more images; and
the intermediary device calculates the degree of achievement of the promotion work at the retail company based on the instruction, the reading completion percentage of the instruction, an analysis result of the one or more images, and the location information and the time information about the one or more images.

13. A non-transitory computer readable medium comprising a program executed on an intermediary device of a system for managing promotion work of a product that a manufacturer wishes to sell, the system comprising a managing device managed by a retail company that sells the product, the intermediary device, and at least one camera at one or more stores of the retail company, the managing device comprising a computer, the intermediary device comprising a processor unit, wherein
the program, when executed by the processor unit, causes the processor unit to execute at least:
delivering an instruction that at least describes promotion work for promoting a sale of the product, to the managing device, wherein the managing device delivers the instruction to the one or more stores according to the instruction, and the at least one camera captures, according to the instruction, one or more evidences showing a result of the promotion work performed at the one or more stores according to the instruction and sends the one or more evidences to the managing device;
receiving the one or more evidences from the managing device;
analyzing one or more images included in the one or more evidences to identify at least one of: a capturing angle of the one or more images, a presence or absence of designated products in the one or more images, the number of designated products in the one or more images, or a presence or absence of a designated point of purchase in the one or more images; and
calculating a degree of achievement of the promotion work at the retail company based at least in part on an analysis result of the one or more images and the instruction, wherein:
the degree of achievement of the promotion work at the retail company includes a storefront achievement ratio of the retail company; and
the storefront achievement ratio of the retail company is represented by $N_1/N_2$, where $N_1$ is the number of stores in which the promotion work satisfying a passing level set by the manufacturer has been performed within a predetermined period among the number of the one or more stores to which the instruction has been delivered, $N_2$ is the number of the one or more stores to which the instruction has been delivered, and the passing level is set in accordance with the instruction.

14. The computer readable medium according to claim 13, wherein the program further causes the processor unit to execute:

determining a promotion cost to be paid by the manufacturer to the retail company based on the degree of achievement of the promotion work at the retail company; and executing processing to collect the promotion cost from the manufacturer.

15. The computer readable medium according to claim 14, wherein the program further causes the processor unit to execute: executing processing to pay at least part of the promotion cost from the manufacturer to the retail company.

16. The computer readable medium according to claim 13, wherein the intermediary device is connected to a database unit, and wherein the program further causes the processor unit to execute: accumulating the degree of achievement of the promotion work at the retail company on the database unit immediately after the degree of achievement of the promotion work at the retail company is calculated.

17. The computer readable medium according to claim 16, wherein the database unit is configured to be viewable by both the manufacturer and the retail company.

18. The computer readable medium according to claim 13, wherein the intermediary device is connected to a database unit, and wherein the program further causes the processor unit to execute: accumulating the one or more evidences on the database unit immediately after the one or more evidences is received.

19. A non-transitory computer readable medium comprising a program executed on an intermediary device of a system for managing promotion work of a product that a manufacturer wishes to sell, the system comprising a managing device managed by a retail company that sells the product, the intermediary device, and at least one camera at one or more stores of the retail company, the managing device comprising a computer, the intermediary device comprising a processor unit, wherein the program, when executed by the processor unit, causes the processor unit to execute at least:

delivering an instruction that at least describes promotion work for promoting a sale of the product, to the managing device, wherein the managing device delivers the instruction to the one or more stores according to the instruction, and the at least one camera captures, according to the instruction, one or more evidences showing a result of the promotion work performed at the one or more stores according to the instruction and sends the one or more evidences to the managing device;

receiving the one or more evidences from the managing device;

analyzing one or more images included in the one or more evidences to identify at least one of: a capturing angle of the one or more images, a presence or absence of designated products in the one or more images, the number of designated products in the one or more images, or a presence or absence of a designated point of purchase in the one or more images;

calculating a degree of achievement of the promotion work at the retail company based at least in part on an analysis result of the one or more images and the instruction;

determining a usage fee for using the intermediary device based on an actual result of past promotion work at the retail company; and executing processing to charge the manufacturer for the usage fee.

20. The computer readable medium according to claim 19, wherein the usage fee includes a delivery cost for delivering the instruction to the retail company, and wherein the determining the usage fee includes:

determining a rate for the delivery cost based on the actual result of the past promotion work at the retail company; and determining the delivery cost based on the rate.

21. A non-transitory computer readable medium comprising a program executed on an intermediary device of a system for managing promotion work of a product that a manufacturer wishes to sell, the system comprising a managing device managed by a retail company that sells the product, the intermediary device, and at least one camera at one or more stores of the retail company, the managing device comprising a computer, the intermediary device comprising a processor unit, wherein the program, when executed by the processor unit, causes the processor unit to execute at least:

delivering an instruction that at least describes promotion work for promoting a sale of the product, to the managing device, wherein the managing device delivers the instruction to the one or more stores according to the instruction, and the at least one camera captures, according to the instruction, one or more evidences showing a result of the promotion work performed at the one or more stores according to the instruction and sends the one or more evidences to the managing device;

receiving the one or more evidences from the managing device;

analyzing one or more images included in the one or more evidences to identify at least one of: a capturing angle of the one or more images, a presence or absence of designated products in the one or more images, the number of designated products in the one or more images, or a presence or absence of a designated point of purchase in the one or more images;

calculating a degree of achievement of the promotion work at the retail company based at least in part on an analysis result of the one or more images and the instruction;

determining a usage fee for using the intermediary device based on the degree of achievement of the promotion work at the retail company, wherein retail companies to which the instruction has been delivered include the retail company; and executing processing to charge the manufacturer for the usage fee.

22. The computer readable medium according to claim 21, wherein the usage fee includes a delivery cost for delivering the instruction to the retail company, and wherein the determining the usage fee includes:

determining a rate for the delivery cost based on the degree of achievement of the promotion work at the retail company; and determining the delivery cost based on the rate.

23. A non-transitory computer readable medium comprising a program executed on an intermediary device of a system for managing promotion work of a product that a manufacturer wishes to sell, the system comprising a managing device managed by a retail company that sells the product, the intermediary device, and at least one camera at one or more stores of the retail company, the managing device comprising a computer, wherein the intermediary device is connected to a database unit, the database unit including stored thereon the degree of achievement of promotion work at each of a plurality of retail companies, and the retail company being one of the plurality of retail companies, the intermediary device comprising a processor unit, wherein the program, when executed by the processor unit, causes the processor unit to execute at least:

delivering an instruction that at least describes promotion work for promoting a sale of the product, to the managing device, wherein the managing device delivers the instruction to the one or more stores according to the instruction, and the at least one camera captures, according to the instruction, one or more evidences showing a result of the promotion work performed at the one or more stores according to the instruction and sends the one or more evidences to the managing device;

receiving the one or more evidences from the managing device;

analyzing one or more images included in the one or more evidences to identify at least one of: a capturing angle of the one or more images, a presence or absence of designated products in the one or more images, the number of designated products in the one or more images, or a presence or absence of a designated point of purchase in the one or more images;

calculating a degree of achievement of the promotion work at the retail company based at least in part on an analysis result of the one or more images and the instruction;

generating recommendation information indicating recommendation for a transaction with at least one retail company of the plurality of retail companies based on the degree of achievement of the promotion work at each of the plurality of retail companies; and notifying the manufacturer of the recommendation information.

24. A non-transitory computer readable medium comprising a program executed on an intermediary device of a system for managing promotion work of a product that a manufacturer wishes to sell, the system comprising a managing device managed by a retail company that sells the product, the intermediary device, and at least one camera at one or more stores of the retail company, the managing device comprising a computer, the intermediary device comprising a processor unit, wherein the program, when executed by the processor unit, causes the processor unit to execute at least:

delivering an instruction that at least describes promotion work for promoting a sale of the product, to the managing device, wherein the managing device delivers the instruction to the one or more stores according to the instruction, and the at least one camera captures, according to the instruction, one or more evidences showing a result of the promotion work performed at the one or more stores according to the instruction and sends the one or more evidences to the managing device;

receiving the one or more evidences from the managing device, wherein each of the one or more evidences includes a reading completion percentage of the instruction and one or more images captured at the one or more stores, each of the one or more images including location information about where each of the one or more images is captured and time information about when each of the one or more images is captured;

analyzing the one or more images to identify at least one of: a capturing angle of the one or more images, a presence or absence of designated products in the one or more images, the number of designated products in the one or more images, or a presence or absence of a designated point of purchase in the one or more images; and calculating the degree of achievement of the promotion work at the retail company based on the instruction, the reading completion percentage of the instruction, an analysis result of the one or more images, and the location information and the time information about the one or more images.

\* \* \* \* \*